United States Patent
Stokes et al.

(10) Patent No.: US 9,946,947 B2
(45) Date of Patent: Apr. 17, 2018

(54) SYSTEM AND METHOD FOR FINDING SADDLE POINT-LIKE STRUCTURES IN AN IMAGE AND DETERMINING INFORMATION FROM THE SAME

(71) Applicant: Cognex Corporation, Natick, MA (US)

(72) Inventors: Earle B. Stokes, Westford, MA (US); Fenghua Jin, Natick, MA (US); William M. Silver, Nobleboro, ME (US); Xiangyun Ye, Framingham, MA (US); Ivan A. Bachelder, Hillsbobough, NC (US)

(73) Assignee: COGNEX CORPORATION, Natick, MA (US)

( * ) Notice: Subject to any disclaimer, the term of this patent is extended or adjusted under 35 U.S.C. 154(b) by 389 days.

(21) Appl. No.: 13/797,910

(22) Filed: Mar. 12, 2013

(65) Prior Publication Data
US 2014/0119665 A1    May 1, 2014

Related U.S. Application Data

(60) Provisional application No. 61/721,012, filed on Oct. 31, 2012.

(51) Int. Cl.
| G06K 9/50 | (2006.01) |
|---|---|
| G06K 9/20 | (2006.01) |
| G06K 7/14 | (2006.01) |
| G06K 9/46 | (2006.01) |
| G06K 7/10 | (2006.01) |
| G06T 7/60 | (2017.01) |

(52) U.S. Cl.
CPC ....... *G06K 9/2063* (2013.01); *G06K 7/10861* (2013.01); *G06K 7/10871* (2013.01);
(Continued)

(58) Field of Classification Search
CPC ............ G06K 7/00; G06K 7/01; G06K 7/016; G06K 7/10; G06K 7/10861;
(Continued)

(56) References Cited

U.S. PATENT DOCUMENTS 6,137,893 A * 10/2000 Michael ............... G06T 7/80
  382/291
6,340,119 B2 * 1/2002 He et al. ............... 235/494
(Continued)

FOREIGN PATENT DOCUMENTS

EP    1286299 B1    5/2009

OTHER PUBLICATIONS

Kuonen, "Computer-Intensive Statistcal Methods: Saddlepoint Approximations With Applications in Bootstrap and Robust Inference", 2001, Publisher: Ecole Polytechnique Federale de Lausanne, Published in: FR.
(Continued)

*Primary Examiner* — Eric Rush
(74) *Attorney, Agent, or Firm* — Loginov & Associates

(57) ABSTRACT

This invention provides a system and method for finding features in images that exhibit saddle point-like structures using relatively computationally low-intensive processes, illustratively consisting of an anti-correlation process, and associated anti-correlation kernel, which operates upon a plurality of pixel neighborhoods within the image. This process enables an entire image to be quickly analyzed for any features that exhibit such saddle point-like structures by determining whether the anti-correlation kernel generates a weak or strong response in various positions within the image. The anti-correlation kernel is designed to generate a strong response regardless of the orientation of a saddle point-like structure. The anti-correlation process examines a plurality of pixel neighborhoods in the image, thereby locating any saddle point-like structures regardless of orientation, as it is angle-independent. The structures are then grouped and refined (for example in a grid) in an effort to locate and decode ID topologies within the image.

17 Claims, 12 Drawing Sheets

(52) U.S. Cl.
CPC ......... *G06K 7/1417* (2013.01); *G06K 7/1443* (2013.01); *G06K 9/4604* (2013.01); *G06K 9/4609* (2013.01); *G06K 9/4623* (2013.01); *G06T 7/60* (2013.01)

(58) Field of Classification Search
CPC .... G06K 7/10871; G06K 7/14; G06K 7/1404; G06K 7/1408; G06K 7/1417; G06K 7/1439; G06K 7/1443; G06K 9/00496; G06K 9/00523; G06K 9/36; G06K 9/46; G06K 9/4604; G06K 9/4609; G06K 9/4614; G06K 9/4619; G06K 9/4623; G06K 9/4628; G06K 19/06037; G06T 7/0081; G06T 7/60; H04N 1/00334; H04N 1/00336
USPC ........ 382/100, 181, 190, 201, 203, 260, 325
See application file for complete search history.

(56) References Cited

U.S. PATENT DOCUMENTS

| | | | |
|---|---|---|---|
| 6,487,516 B1 | 11/2002 | Amorai-Moriya | |
| 6,601,772 B1* | 8/2003 | Rubin et al. | 235/494 |
| 6,823,077 B2 | 11/2004 | Dietz et al. | |
| 7,260,259 B2 | 8/2007 | Comaniciu et al. | |
| 7,619,607 B2 | 11/2009 | Zhang et al. | |
| 7,712,664 B2 | 5/2010 | Takahashi et al. | |
| 7,848,571 B2* | 12/2010 | Ratner | G06K 9/4638 382/173 |
| 7,980,473 B2* | 7/2011 | Zhang et al. | 235/462.41 |
| 8,011,596 B2 | 9/2011 | Longacre, Jr. | |
| 8,224,018 B2 | 7/2012 | Rhoads et al. | |
| 2002/0121550 A1* | 9/2002 | Gorbet et al. | 235/462.01 |
| 2003/0228030 A1* | 12/2003 | Wendt | G06T 1/0064 382/100 |
| 2009/0230193 A1* | 9/2009 | Al-Hussein et al. | 235/462.11 |
| 2011/0069875 A1* | 3/2011 | Goto | 382/131 |
| 2011/0293146 A1 | 12/2011 | Grycewicz | |
| 2012/0121127 A1* | 5/2012 | Aoki et al. | 382/103 |
| 2012/0145779 A1* | 6/2012 | Bietenbeck et al. | 235/375 |

OTHER PUBLICATIONS

Butler, et al., "Uniform Saddlepoint Approximations for Ratios of Quadratic Forms", 2008, Publisher: Department of Statistical Science, Southern Methodist University, Published in: US.

* cited by examiner

SYSTEM AND METHOD FOR FINDING SADDLE POINT-LIKE STRUCTURES IN AN IMAGE AND DETERMINING INFORMATION FROM THE SAME

RELATED APPLICATION

This application claims the benefit of U.S. Provisional Application Ser. No. 61/721,012, filed Oct. 31, 2012, entitled SYSTEM AND METHOD FOR FINDING SADDLE POINT-LIKE STRUCTURES IN AN IMAGE AND DETERMINING INFORMATION FROM THE SAME, the entire disclosure of which is herein incorporated by reference.

FIELD OF THE INVENTION

This invention relates to machine vision systems and more particularly to vision systems used to find and decode symbology based ID information in an acquired image.

BACKGROUND OF THE INVENTION

Vision systems that perform measurement, inspection, alignment of objects and/or decoding of symbology codes or marks (e.g. one-dimensional (1D) and two-dimensional (2D) DataMatrix bar codes, QR codes, DotCodes, etc.—also termed "IDs") are used in a wide range of applications and industries. These systems are based around the use of an image sensor (also termed an "imager"), which acquires images (typically gray scale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or gray scale intensities. In the example of an ID reader (also termed herein, a "camera"), the user or automated process acquires an image of an object that is believed to contain one or more barcodes, 2D codes or other ID types. The image is processed to identify code features, which are then decoded by a decoding process and/or processor to obtain the inherent data represented by the code. This data can be alphanumeric and/or other data types.

When decoding IDs, one task is to rapidly find regions of the overall image that have a high-probability of containing such ID-like features. This "ID finding" procedure allows further processes, such as ID decoding, which are computationally intensive, to focus upon the regions that appear to contain probable ID targets. Thus, the time needed to process IDs is generally reduced, leading to generation of results more quickly and accurately. In the case of various forms of 2D ID codes, such as DataMatrix, QR and Dot-Code, the finding of code features can sometimes prove challenging. In broader vision system applications, a common task is to locate and analyze certain image features to derive various information, such as the relative location of that feature within a scene and/or motion of that feature through a scene.

SUMMARY OF THE INVENTION

This invention overcomes disadvantages of the prior art by providing a system and method for finding features in images that exhibit saddle point-like structures using relatively computationally low-intensive processes, illustratively consisting of an anti-correlation process, and associated anti-correlation kernel, which operates upon a plurality of pixel neighborhoods within a region of interest of the image. This process enables an entire image to be quickly analyzed for any features that exhibit such saddle point-like structures by determining whether the anti-correlation kernel generates a weak or strong response in various positions within the image. The anti-correlation kernel is designed to generate a strong response regardless of the orientation of a saddle point-like structure. The anti-correlation process examines a plurality of pixel neighborhoods in the image, thereby locating any saddle point-like structures regardless of orientation, as it is angle-independent. In various embodiments, the structures are then grouped and refined (for example by placing them in a grid) in an effort to locate ID topologies within the image. Any located ID information can be decoded directly from information provided by the grouped saddle point-like structures, or more typically, the ID features from the image along established grid lines are sampled and that grayscale data is eventually decoded.

In an illustrative embodiment, a system and method for determining saddle point-like structures in an image with a vision system processor includes an anti-correlation process. This process is constructed and arranged to operate on neighborhoods of pixels within the image and to identify saddle point candidates within the neighborhoods. In each such neighborhood, a measure of anti-correlation is computed between the neighborhood and a 90 degree rotated copy of itself. Saddle point structures tend to be strongly anti-correlated with themselves rotated 90 degrees, regardless of their orientation relative to the pixel grid. Illustratively, a saddle point is identified when the response of the anti-correlation kernel is stronger than some threshold, stronger than the response at neighboring positions, or both. A verification process can also apply, to each of the neighborhoods, a kernel that defines a 180-degree rotated version of each of these neighborhoods, respectively. Each kernel can include a null center of at least one or more pixels in size. Illustratively, the anti-correlation operates using at least one of a normalized correlation formula and a sum of absolute differences formula, among other formulas. A refinement process then establishes the saddle point-like structures within the image by determining dominant angles with respect to saddle point-like candidates and spacing between adjacent saddle point-like candidates. The refinement process also groups the saddle point-like structures based upon the respective dominant angles and the spacings between the adjacent saddle point-like structures. A grid-fitting process then establishes an approximately rectilinear grid containing the grouped saddle point-like structures. This can include elimination of structures residing outside of grid lines and/or reestablishing the grid over more promising structures if the previous grid fitting process fails to generate a desired topology. This topology can be based upon a 2D ID, and more particularly based upon a DotCode ID format. An ID determination process generates ID information for use in decoding based upon the saddle point-like structures in the grid.

In another embodiment, a system and method for decoding an ID in an image using a vision system processor is provided. This system and method includes a saddle point like-structure determination process that generates grouped saddle point-like structures with respect to the image. An ID determination process generates ID information based upon the grouped saddle point-like structures. An ID decoding process decodes the ID information to provide data that can be transmitted to a data handling system. Illustratively, the saddle point like-structure determination process operates using an anti-correlation process. This process operates on a plurality of pixel neighborhoods within (at least) a region of interest in the image and identifies saddle point candidates within the neighborhoods that are filtered to generate the saddle point-like structures used in the ID determination process.

BRIEF DESCRIPTION OF THE DRAWINGS

The invention description below refers to the accompanying drawings, of which.

DETAILED DESCRIPTION

I. Vision System Overview

Figure 1:
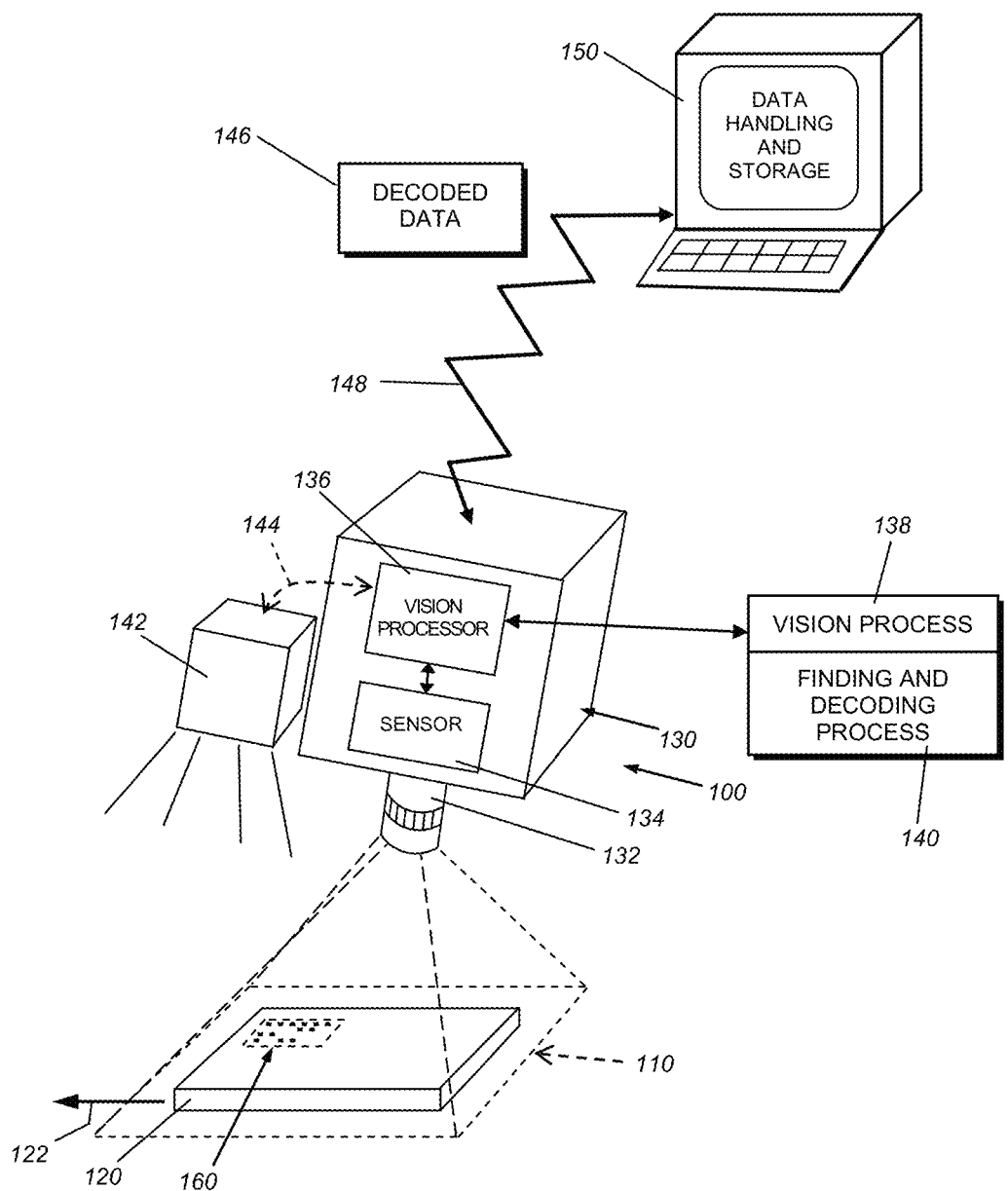
FIG. 1 is a diagram of a vision system arrangement acquiring images of objects containing IDs, moving through an imaged scene according to an illustrative embodiment.

FIG. 1 details a typical implementation of a machine vision system 100 (also termed herein a "vision system", or more basically, "system") that is shown as a fixed mount arrangement that acquires images of a scene defined by a field of view 110. Alternatively, the system can be implemented as a movable device, either using a movable mount or a handheld arrangement. In this embodiment, and by way of non-limiting example, the system is adapted to scan objects (e.g. object 120) that is in motion relative to the system 100. For example, the object can move (arrow 122) through the imaged scene along a conveyor and/or production line. As such, the system 100 acquires one or more image frame(s) of the object when it is within the field of view 110. This acquisition can be triggered by a visual detection process, a part detector, an encoder on the conveyor line or any other acceptable technique that should be clear to those of skill.

The illustrative system 100 includes a camera assembly 130 and associated lens 132 that can be any acceptable vision system camera arrangement (also termed more generally a "camera"). The camera includes an image sensor (also termed an "imager") 134 that receives light from the lens 132 that is focused on the pixel array of the sensor 134, which also defines the image plane perpendicular to the camera's optical axis. The sensor can be color or, more typically gray scale, and can be CMOS, or any other acceptable circuit type (e.g. CCD). In this embodiment, the sensor is operatively interconnected with an on-board vision processor 136 that performs appropriate, conventional machine vision processes 138, such as edge-finding, blob analysis, etc. The processor 136 also performs specific ID finding and decoding processes 140 according to the illustrative embodiment. Other processes, such as illumination control, auto-focus, auto-regulation of brightness, exposure, etc., can also be provided as appropriate. Illumination of the scene (optional) can be provided by an external illuminator 142 as shown, and/or by internal illumination (not shown) associated with the camera. Such internal illumination can be mounted, for example, at locations on the front face of the camera around the lens. Illumination can be triggered by the processor 136 or an associated circuit, as shown by the dashed line 144. Decoded data (e.g. decoded ID information in alphanumeric and/or other data forms) 146 is transmitted by a link 148 to a data handling and storage system 150 (e.g. an inventory control system) depicted as a computer or server. The link can be wired or wireless as appropriate.

It should be clear that the depicted system 100 is illustrative of a wide variety of systems that, as described further below, can be adapted to other vision system applications than ID reading, such as video analysis, robot manipulation, and the like. Thus, the description of the illustrative embodiment in connection with an ID reader arrangement is meant to be illustrative of systems and processes that one of skill can apply to other vision system applications. More generally, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software.

II. Saddle Point Features

In the illustrative embodiment, the object 120 in the scene 110 includes one or more features of interest that, by way of example, comprise a printed DotCode structure 160. A DotCode ID, as well as certain other 2D ID codes, including (but not limited to) DataMatrix and QR. These codes are generally characterized by a regular two-dimensional grid of printed circles or rectangles. The region between such printed features can be characterized as a "saddle point". Illustratively, a saddle point is a position in the image where intensity is locally maximal along one direction and locally minimal along a perpendicular (90-degree rotated) direction.

Figure 2:
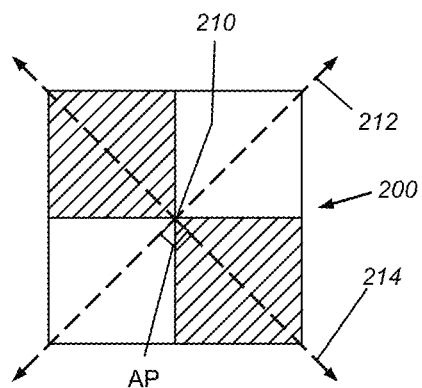
FIG. 2 is a diagram of an exemplary checkerboard pattern containing a saddle point structure.

With reference to FIG. 2, four squares of a light and dark checkerboard 200 are depicted. The point 210 where the four squares meet (the vertex) can be characterized as a strong saddle point. That is, the intensity at the saddle point 210 is locally minimal along the direction 212 taken through the corners of the light squares, while the intensity at the same point 210 is locally maximal in the perpendicular (angle AP) direction 214 through the corners of the dark squares. In this context, light intensity is defined as a maximum value, while dark intensity is defined as a minimal value, but the converse can also be true where dark is defined as a maximum intensity while light is defined as a minimal intensity. Furthermore, any numerical values, whether arising from light intensity or any other physical or computational process, can be used to define saddle points. Here "locally" means in the neighborhood of the saddle point, and not necessarily maximal or minimal relative to anywhere else in the image.

Figure 3:
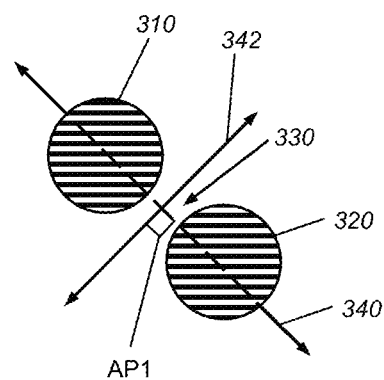
FIG. 3 is a diagram of two adjacent dot features in an exemplary DotCode matrix for which saddle point structures can be determined according to an illustrative embodiment.

Thus, recognizing that a saddle point can exist between two features reference is made to FIG. 3, which shows a pair of exemplary DotCode dark-printed dot features 310 and 320, residing within a light surrounding field 330, and that generate a saddle point response. Alternatively, the dots can be light and the field can be dark, or the dots can be represented by a peened surface surrounding a smooth and/or specular surface. In general, the dots and the field represent discernable structures in the image using visible light and/or near-visible light, such as IR. As shown, and as described below, an anti-correlation process can be employed with respect to such pairs of dots so that the dots 310, 320 effectively define a direction 340 of minimal intensity, with a maximal intensity generally in the perpendicular (angle AP1) direction 342.

Since a DotCode ID (and certain other 2D IDs) provides a regular placement/spacing and alignment of dots, it lends itself to ID finding techniques based upon the location of saddle point-like features as described below. Note, for simplicity the term "saddle point" shall also be applied to features that are by definition saddle point-like features. This technique uses the saddle points themselves to determine the presence of a DotCode matrix, and thus, the illustrative system and method is relatively agnostic to the size of the dots, which can vary in practice based upon the state of the printer (typically a dot matrix printer through which an object is passed) and based upon the surface being printed.

III. Saddle Point Determination Process

Figure 4:
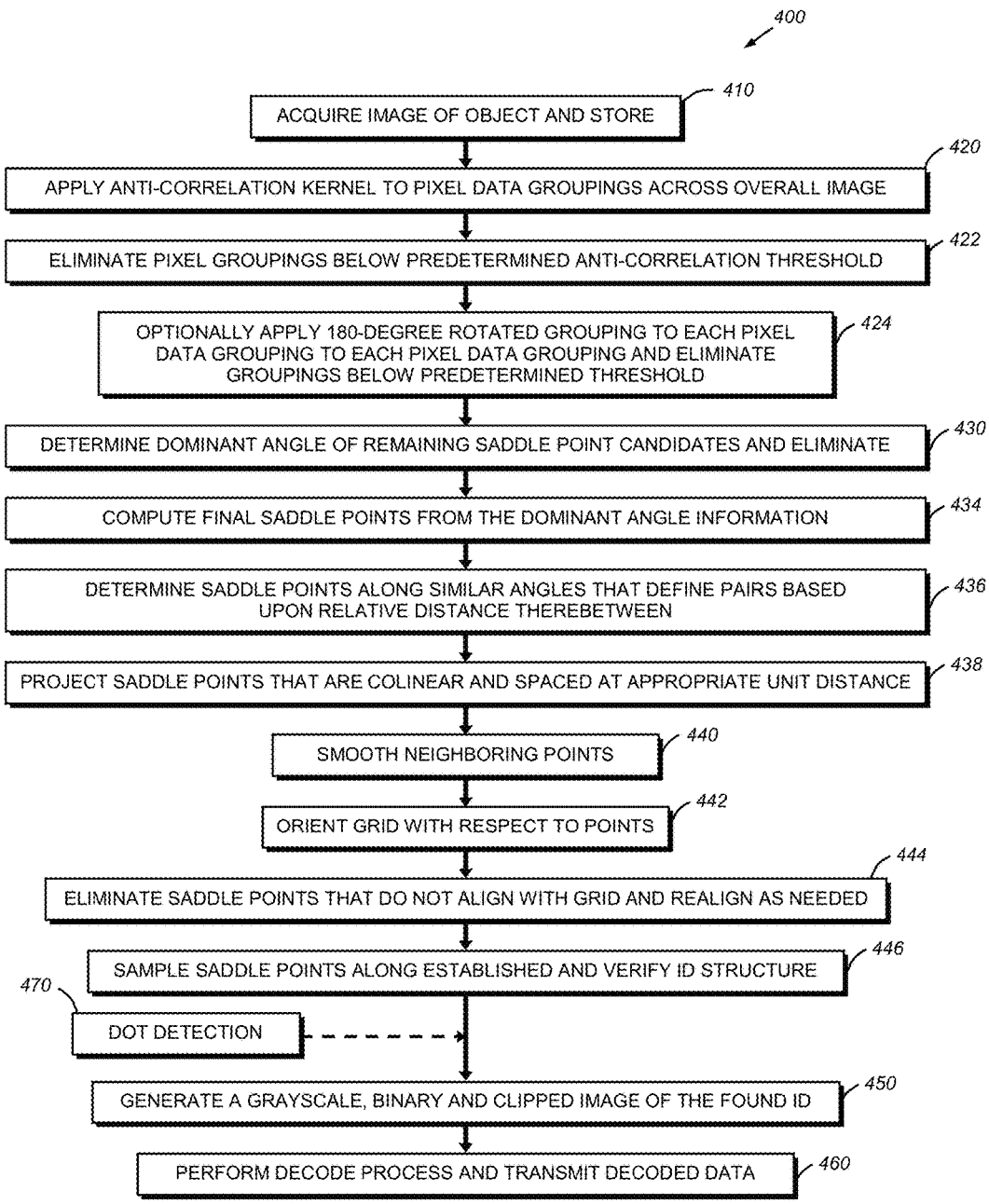
FIG. 4 is a flow diagram of an overall procedure for finding saddle point-like structures in an image and determining information, such as DotCode IDs therefrom, according to an illustrative embodiment.
Figure 5:
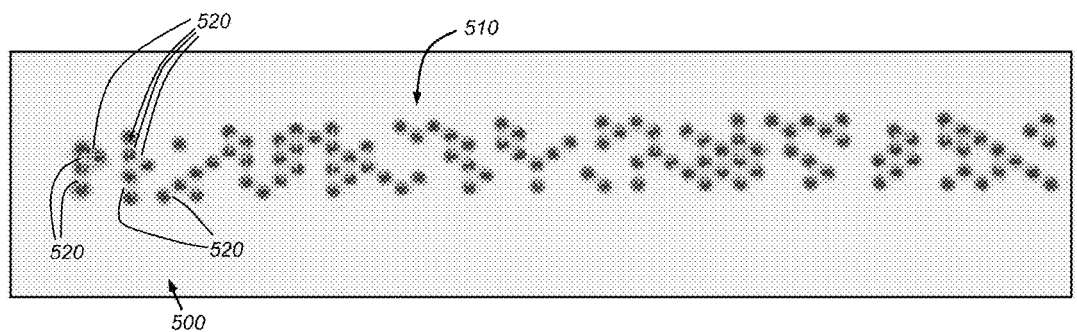
FIG. 5 is a screen display of a portion of an image containing saddle point-like structures showing the initial identification of saddle point candidates using an anti-correlation process according to the procedure of FIG. 4.
Figure 6:
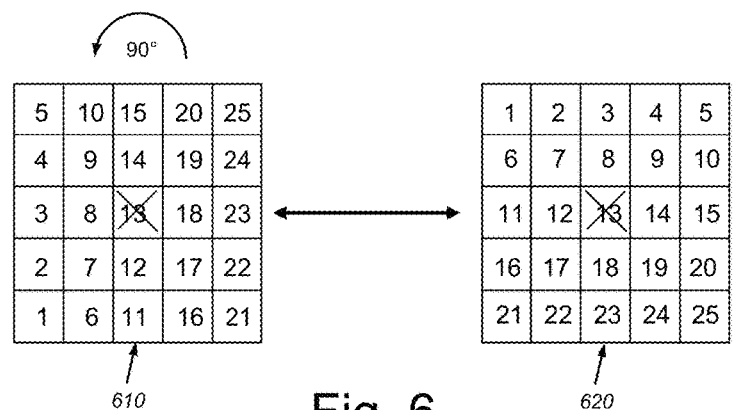
FIG. 6 is a diagram showing the application of a 90-degree-rotated anti-correlation kernel to a neighborhood of pixels in the overall image to generate information with respect to possible saddle point candidates within the image according to the procedure of FIG. 4.

Reference is made to FIG. 4, which shows an overall procedure 400 for locating saddle point structures within an image and determining the presence or absence of features of interest, such as DotCode IDs based upon the arrangement of saddle point features in a portion of the image. The procedure 400 begins with the acquisition of an image of the object, or another subject in the scene, in step 410. Based upon this acquired image, in step 420, the procedure searches for any candidates for saddle point-like structures. The results of such a search are shown by way of example in FIG. 5, in which a screen display 500 shows a portion of the overall image containing an exemplary ID (a DotCode ID in this example) 510. In operation, the procedure scans the entire image or a smaller portion thereof—for example a portion thought to contain the edges of the object—to locate any saddle point-like candidates. As shown in FIG. 5, such candidates are symbolized by crossing lines (Xs), such as crossed lines 520. Illustratively, and with reference also to FIG. 6, saddle-point like candidates are determined using an anti-correlation kernel 610. The procedure 400 scrolls through each pixel location in the overall image (or a region of interest in the overall image), and at each pixel location operating on an M×N (with M=N) neighborhood 620 of pixel intensity values (1-25). In this embodiment, a 5×5 neighborhood is defined. Any size neighborhood can be employed, but a tradeoff between a sufficient data sample (for reliable measurement) and processing speed makes a neighborhood size between 4×4 and 6×6 desirable in various embodiments. Moreover, the size of the neighborhood can determine how granular the "filter" to either find or not find saddle point-like candidates will be. The size of the filter can also depend upon the relative size of the features (e.g. the dot size). The determination of the filter size can be preset (during a setup set) or learned based on iterative operation of the procedure. Illustratively, the anti-correlation kernel is the same pixel (intensity) neighborhood rotated by 90 degrees as shown. In comparison using a conventional normalized correlation formula, the 90-degree-rotated anti-correlation kernel 610 should indicate a wide intensity variance versus the original neighborhood of pixels where a saddle point structure is present, and such positions are noted. In particular, on a scale of −1 to +1, the normalized correlation between pixels identified by the numbers 1-25 in the original pixel neighborhood kernel 610, and the like-numbered pixels in rotated kernel 620, should approach −1. Where this correlation does not fall below a threshold generally between −1 and 0, or fall below that of neighboring positions, the particular pixel neighborhood can be eliminated from the analysis as not indicating sufficient saddle point-like characteristics. Note that a variety of formulas clear to those of skill can be used to compute the strength of anti-correlation between pixel pairs in each of the two matrices. For example, a sum of absolute differences formula can be used in alternate embodiments, with adjustments to the expected range and thresholds as will be apparent to one of ordinary skill in the art.

As noted, the size of the M×N neighborhood of pixels is highly variable. More particularly, in the case of an odd-sized value for M and N, the center pixel (i.e. pixel 13) is ignored, as indicated by the crossed-out value. This prevents the same pixel from being compared to itself. Note that the anti-correlation kernel 610, while shown rotated counter-clockwise, can be rotated clockwise by 90 degrees in alternate embodiments. The anti-correlation process moves through the image, shifting one column (or row) of pixels at a time until all M×N neighborhoods have been compared. Notably, by scrolling through every pixel within the image, the procedure enables anti-correlation to be determined regardless of the actual angle in the image at which the saddle point candidates are oriented—rendering it essentially angle-agnostic.

Figure 7:
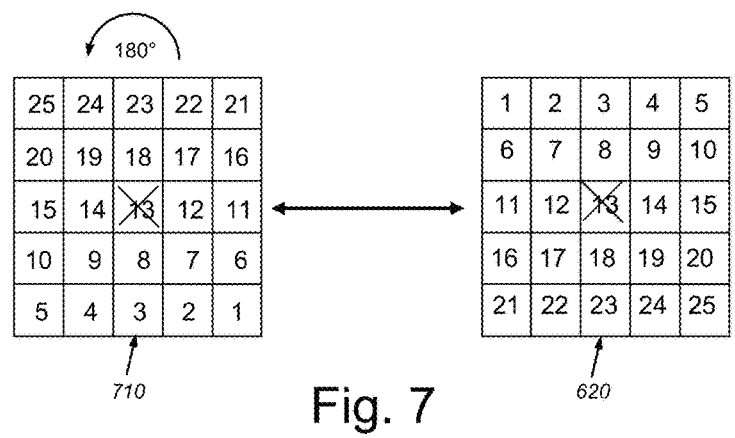
FIG. 7 is a diagram showing the application of a kernel, defining a 180-degree rotated version of the original neighborhood of pixels in the overall image to the original neighborhood of pixels of FIG. 6 to optionally verify saddle point behaviour within the neighborhood.

While optional in various embodiments, to improve accuracy the anti-correlation process (at step 424) can also compare the neighborhood 620 with a 180-degree rotated version of itself (710), as depicted in FIG. 7. This can allow determination if the 180-degree computation is relatively similar to the original neighborhood thereby further indicating saddle point-like characteristics for the original pixel neighborhood. In a generalized embodiment, the processing of pixel neighborhoods using a single 90-degree rotated anti-correlation kernel can be employed to achieve acceptable results free of further verification using the 180-degree rotated neighborhood.

It should be clear that the use of an anti-correlation process to determine saddle point-like candidates is advantageous in that it entails a relatively small application of processing resources, and thus can be performed rapidly across an entire image. That is, the computational overhead involved with a 90-degree rotation of a pixel neighborhood is relatively small as the individual pixel intensity values are simply rearranged from one organization to the other. This allows more-intensive processes to be focused upon regions of the overall image that contain a particular saddle-point characteristic, such as a region containing a large cluster of such saddle-point like candidates—indicative of the presence of an ID in that region.

In various embodiments, it is contemplated that the 90-degree and 180-degree rotated anti-correlation kernels can provide a null center that is larger than one (1) pixel. For example, a null center that excludes nine (9) pixels (or another number) can be provided.

In various applications, the determination of saddle point-like candidates in an overall image can then be applied to solve a particular vision system problem, such as monitoring a checkerboard fiducial as it moves through a series of image frames—for example in a high-speed video of a crash test, in a printed half-tone image, or on the end of a tracked robot arm.

IV. ID Decoding Process Using Saddle Point-like Candidates

By identifying regions containing saddle points, the area of interest within the overall image that is analyzed for ID information is significantly reduced. This speeds the decoding process. Moreover, by performing additional steps to eliminate random saddle point features within the overall image that do not contain ID characteristics, the area of interest is further reduced and the speed of the associated decoding process is further increased.

With reference again to the procedure 400 of FIG. 4, once the anti-correlation points have been determined from the process (as shown in FIG. 5), the procedure can use this information to locate and eventually decode a 2D ID, such as the depicted, exemplary DotCode. It is noted that DotCode dots have saddle-like features as opposed to a true saddle point as found in a "checkerboard" pattern. However, the above-described anti-correlation process effectively locates such features. Additional filtering techniques can be employed to address the existence of a light (or contrasting) background field between non-touching dots. In step 430, the procedure 400 determines the dominant angle for the remaining saddle point-like candidates. This is indicated in the image 800 as the various crossed lines 810. This entails determining the acting direction of the anti-correlation results in adjacent groups of pixels in areas already identified as candidates. Note that the lines can occur in duplicates and triplicates (e.g. lines 820) representing multiple pixels that indicate a similar saddle-like behavior.

Figure 8:
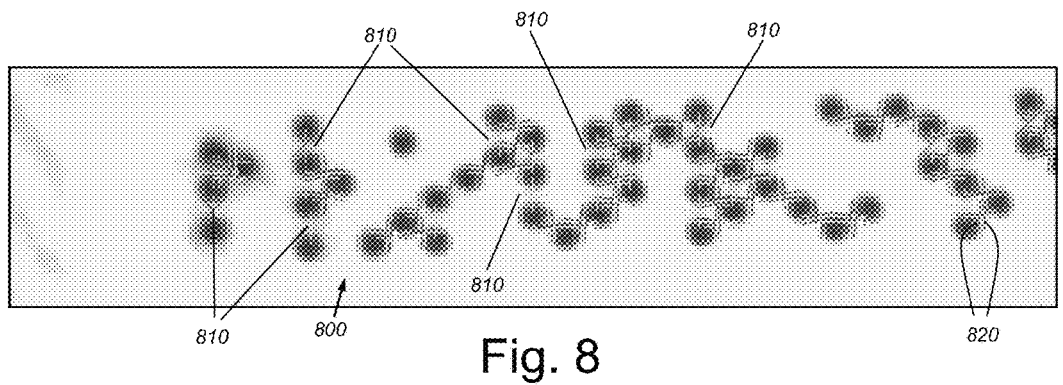
FIG. 8 is a screen display showing the determination of dominant angles in the saddle point candidates according to the procedure of FIG. 4.
Figure 8A:
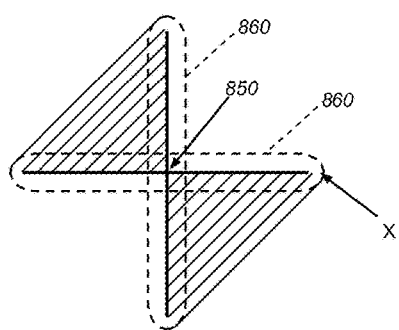
FIGS. 8A and 8B are each graphical representations of a pair of kernels that can be used to operate on the original neighborhood of pixels to determine a dominant angle for a saddle point-like feature contained therein.
Figure 8B:
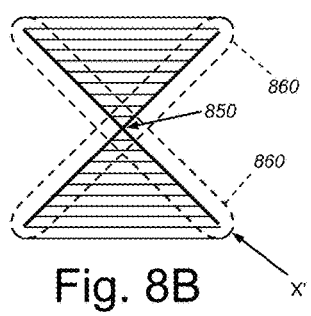

According to an embodiment, the computation of the dominant angle is performed by subjecting the neighborhood of pixels containing a centered saddle point 850 to two kernels that are graphically represented in FIGS. 8A and 8B as X and X', where X' is rotated at 45 degrees with respect to X. By applying the formula ½*arctan 2(R(X)',R(X)), where the function R represents the response of a kernel, the angle can be approximately determined. Because saddle points can be detected at either 0 or 90 degrees, a pair of kernels having a 45-degree range (half of 90 degrees) can be used to estimate the dominant angle. The depiction includes zones 860 in which certain pixels along boundary lines are ignored so as to provide an improved estimate of dominant angle. By way of example, if X provides a strong response then the saddle point is aligned vertically. If X' provides a strong response, then the saddle point is aligned at 45 degrees. If both kernels provide some response, then the saddle point is aligned proportionally between 0 and 45 degrees and the magnitude of each response allows the angle (between 0 and 45 degrees) to be measured. For example, an approximately equal response from each of X and X' indicates a dominant angle of approximately 22.5 degrees.

According to an embodiment, the following program instruction set defines each of a pair of dominant-angle-determination kernels for a 5×5 neighborhood of pixels:

```
/* Determine dominant angle
  -1, -1, 0,  1,  1       0, -1, -1, -1, 0
  -1, -1, 0,  1,  1       1,  0, -1,  0, 1
   0,  0, 0,  0,  0       1,  1,  0,  1, 1
   1,  1, 0, -1, -1       1,  0, -1,  0, 1
   1,  1, 0, -1, -1       0, -1, -1, -1, 0
*/
uv0 = (c_Int16)(-a00 - a01 + a03 + a04
       -a10 - a11 + a13 + a14
       +a30 + a31 - a33 - a34
       +a40 + a41 - a43 - a44);
uv1 = (c_Int16)(-a01 - a02 - a03
       +a10 - a12 + a14
       +a20 + a21 + a23 + a24
       +a30 - a32 + a34
       -a41 - a42 - a43);
saddle_angle = atan2(uv1, uv0);
```

In the above program instruction set, the response function R is omitted, and the exemplary saddle_angle computation alternatively computes angle over a full 180-degree range, instead of the graphically depicted 90-degree range (FIGS. 8A and 8B). Either approach can be employed to achieve an acceptable estimation of dominant angle.

Figure 9:
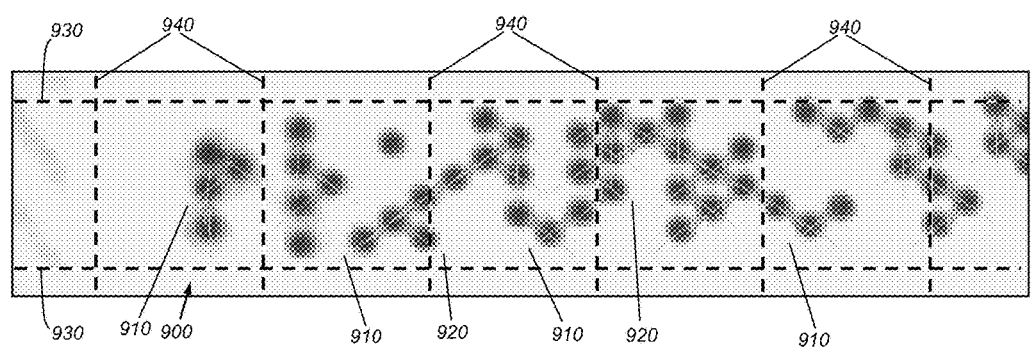
FIG. 9 is a screen display showing the determination of a final group of saddle points within the portion of the image according to the procedure of FIG. 4.

In step 434, the procedure 400 eliminates multiple found saddle points, and aligns a plurality of remaining, adjacent saddle points into a line along a common dominant angle as represented by the display image 900 in FIG. 9. The lines 910 and 920 represent an alignment of saddle-points in each of two orthogonal directions (corresponding generally with the layout of the ID grid). Note that this process occurs across the entire image and, as described further below, can also form lines of saddle points on "noise" features that extend in additional directions. Further techniques as described below are employed to filter any such noise features. It is contemplated that the dots can range between approximately 3 pixels-per-dot and 14 pixels-per-dot by way of example. Note that the image can be broken up into sectors or "tiles" delineated by horizontal and vertical dashed lines 930 and 940, respectively. This delineation into tiles can be used in subsequent processes described below. The tiles are illustratively 32×32 pixels in size, but other dimensions are expressly contemplated. The procedure processes points with respect to each tile. The results of adjacent tiles that include found ID features are eventually combined into a final result.

Figure 10:
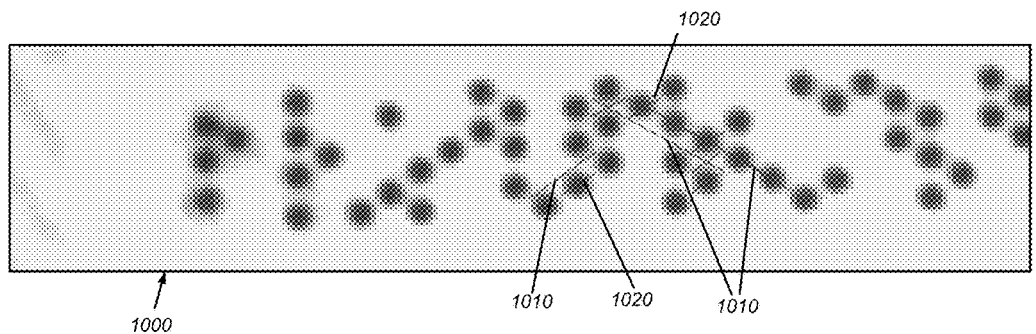
FIG. 10 is a screen display showing the arrangement of saddle points into pairs and measuring of relative distances and angles according to the procedure of FIG. 4.

In step 436, the aligned saddle points are analyzed for "pair" relationships, in that the spacing therebetween is within a predetermined range as would be found in the grid of an ID. As shown in the image display 1000 of FIG. 10, the procedure determines which saddle points reside along the same dominant angle (lines 1010 and 1020) and appear to be spaced at a relatively similar unit distance therebetween. These similarly spaced and collinear points are grouped together and form the basis of the establishment of the ID grid in subsequent steps. The spacing of saddle points can be a multiple of the unit distance. Illustratively, the distances between points are placed in a histogram, and the procedure searches for peaks. This provides information relative to the smallest common unit distance with the group of saddle points. This distance takes into account points that are too close together to be part of a code. The angles can also be histogrammed and the most frequent angles are identified. The characteristics of the ID are used to provide a threshold that can be used to decide which angles are most likely associated with the ID grid.

Figure 11:
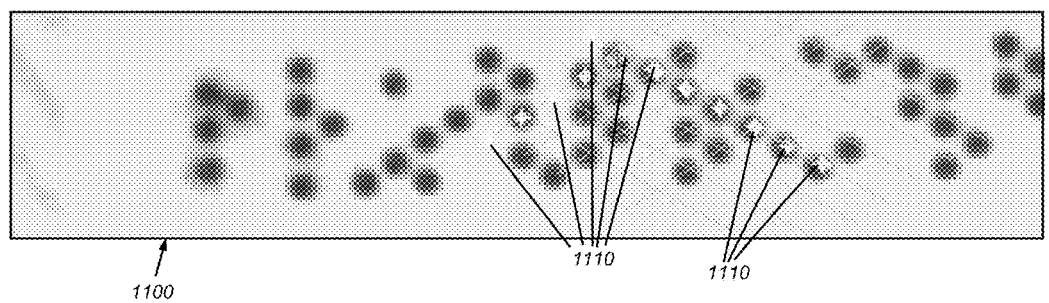
FIG. 11 is a screen display showing the projection of paired saddle points along common lines and angles according to the procedure of FIG. 4.
Figure 12:
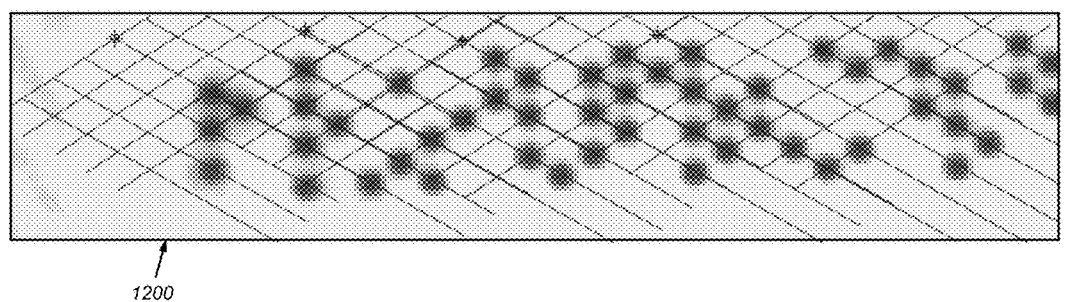
FIG. 12 is a screen display showing the smoothing of the groups of points residing along common lines and angles according to the procedure of FIG. 4.

Once saddle points have been aligned and spaced at appropriate unit distances, the procedure 400 in step 438 can project all such points 1110 as depicted in the display 1100 of FIG. 11. The procedure then smoothes the saddle points (step 440) as depicted in the display 1200 of FIG. 12 using a filtering process that removes spurious points and/or features that reside within a "quiet zone" extending beyond the location at which the cluster of saddle point features appears to define a boundary. The tiles can be illustratively combined to join adjacent clusters of saddle points into a continuous, aligned structure. Note that for purposes of accuracy, a quiet zone of a predetermined number of pixels can be specified by the manufacturer for the procedure to operate efficiently.

Illustratively, the procedure continually eliminates saddle points that do not appear to fit the model of an ID. When a sufficient quantity of points is eliminated, then an underlying tile can be eliminated from the group of candidate tiles. At this time in the process, the procedure has determined that a set of saddle points appear to meet the required geometric characteristics/topology of an ID—that is, the saddle points fall within expected locations for those of an ID.

Figure 13:
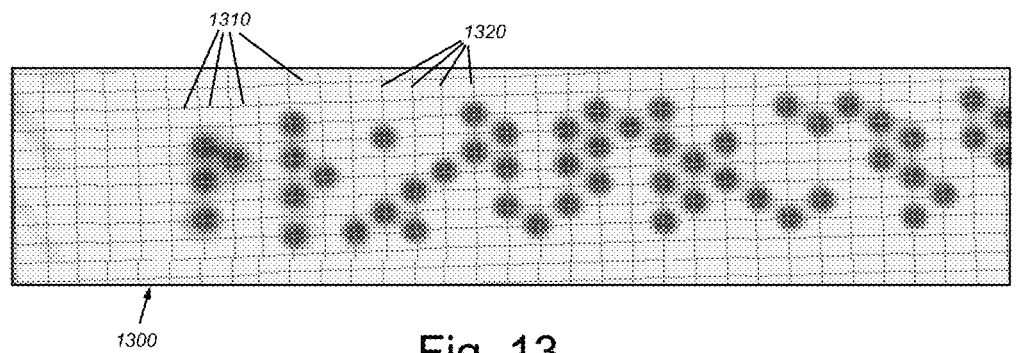
FIG. 13 is a screen display showing the fitting of a grid to the saddle points according to the procedure of FIG. 4.

In procedure step 442, a regular grid is fit to the saddle points. This is symbolized by horizontal and vertical grid lines 1310, 1320 in display 1300 of FIG. 13. This grid is approximately rectilinear. As shown, the saddle points should fall within the center of the squares of the grid to achieve appropriate fit and alignment. According to procedure step 444, to the extent that saddle points do not align with the established grid, such saddle points are removed and the grid is realigned as appropriate. If the realignment fails to produce a group of points having the size, resolution and general layout (generic qualities) of an ID structure, then the grid can be reestablished over a different group of saddle points until a structure that appears to conform to the size, resolution and layout of an ID is aligned. In general, the procedure can employ conventional finding algorithms, based upon the saddle points in the grid to finally locate the ID.

Figure 14:
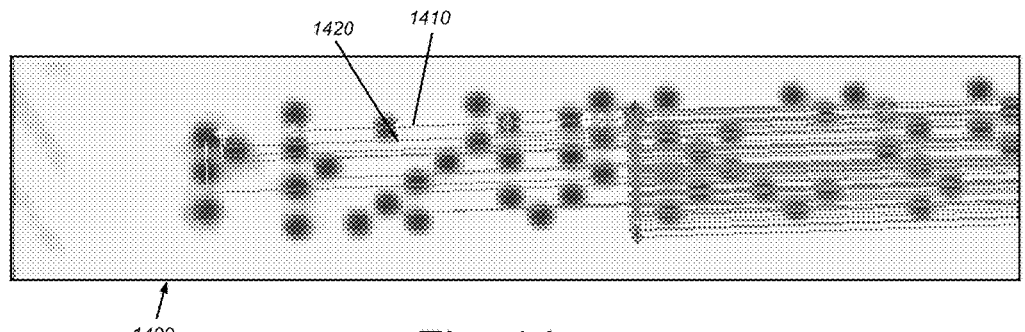
FIG. 14 is a screen display showing the determination of the extent of the group or "bounding box" for use in the procedure of FIG. 4.

FIG. 14 shows a display 1400 of the further step of determining the extent of the group of saddle points or a "bounding box". Each saddle point is projected along each grid axis to find an intercept with the other axis (for example axes 1410 and 1420. The minimum and maximum intercept is employed to determine the extent of the group. The procedure 400 can focus processing on regions within the extent/bounding box.

Figure 15:
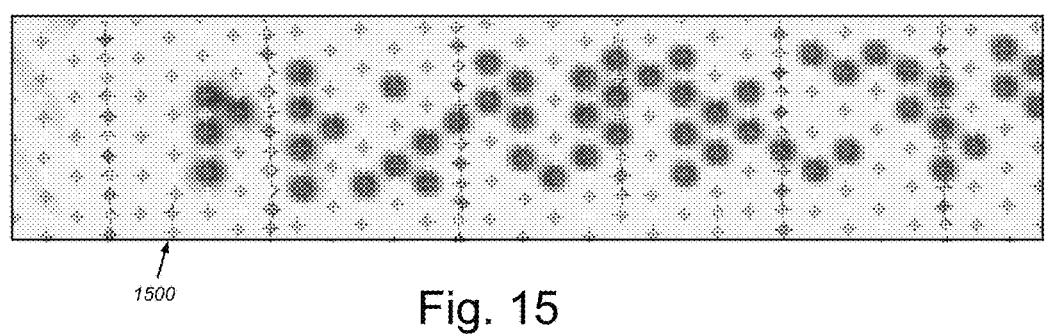
FIG. 15 is a screen display showing the sampling of saddle points relative to an expected geometry of an ID.

In procedure step 446, the saddle points along the grid and within the expected boundaries of an ID structure are sampled. This is depicted in the display 1500 of FIG. 15.

Figure 16:
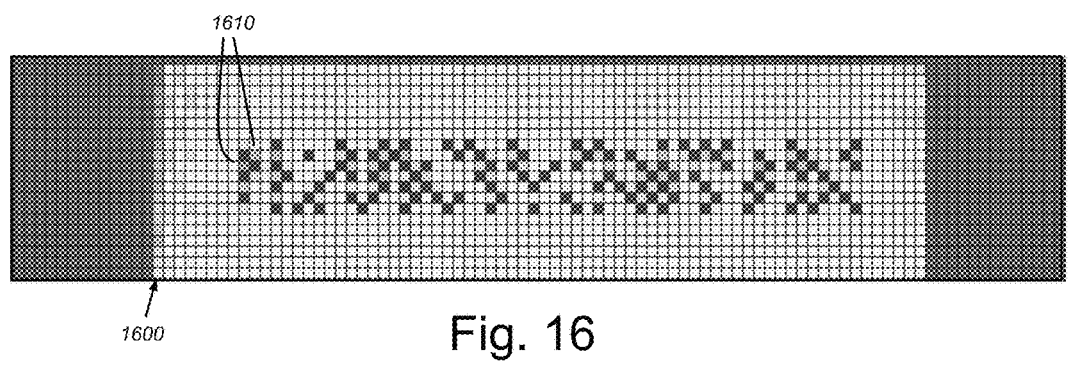
FIG. 16 is a screen display showing the sampling and generation of a gray scale version of the ID from the image based upon the verified location of associated saddle points according to the procedure of FIG. 4.
Figure 17:
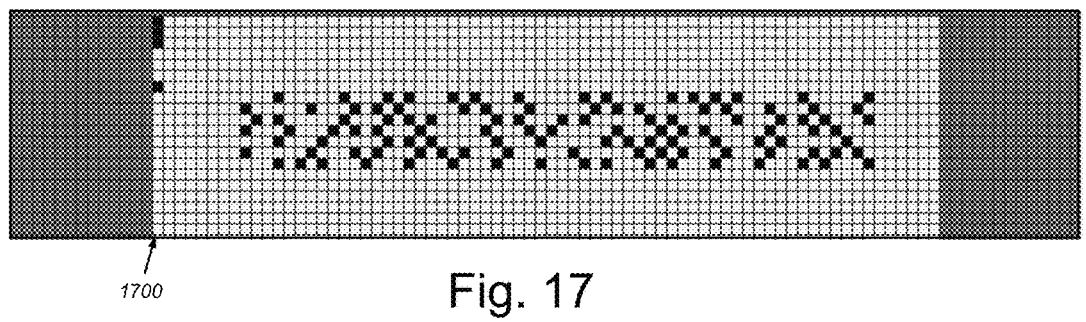
FIG. 17 is a screen display of a thresholded binary version of the ID image of FIG. 16.
Figure 18:
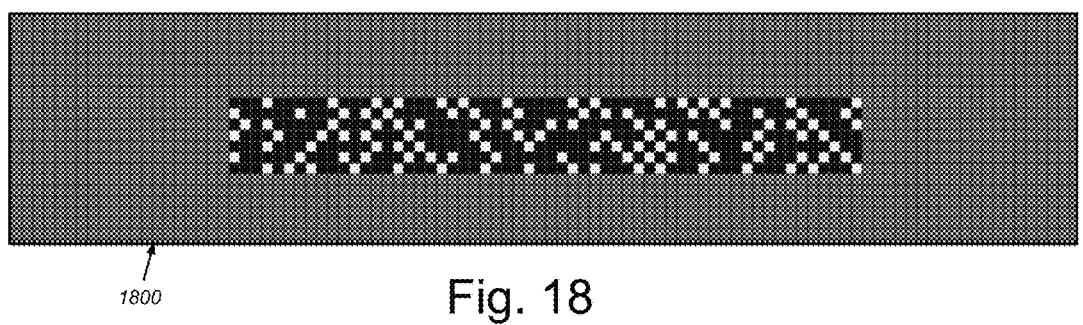
FIG. 18 is a screen display of a clipped and negative version of the binary image of FIG. 17.

Once the ID has been verified, the procedure, in step 450 can sample and generate a gray scale version of the dots in the image, locating them with respect to associated saddle points (as depicted in the display 1600 of FIG. 16). As shown, certain dots (1610) appear light gray. Typically, such dots are the result of uneven printing or lighting across the imaged ID, or because the gray pixels in the sampled ID were located based on inaccurate grid positions that, in fact, cause an edge of the gray dot to be sampled, rather than a more central portion of that dot. The gray scale version of the ID can be converted to a binary (full light and full dark) image as depicted in the display 1700 of FIG. 17, at which time gray scale dots are either thresholded into a full light or full dark state. Illustratively, adapted thresholding is used to resolve any gray pixels. Then the ID can be clipped as shown in the display 1800 of FIG. 18 so that any regions beyond its boundaries are eliminated. The ID can also be presented as a negative image as shown. The ID is then presented to the decoding process (procedure step 460) from which the decoded information is transmitted to the data handling system. In decoding the ID, the decoding process can perform a conventional sampling of grayscale pixels at each found grid location to generate the desired decoded data.

Figure 19:
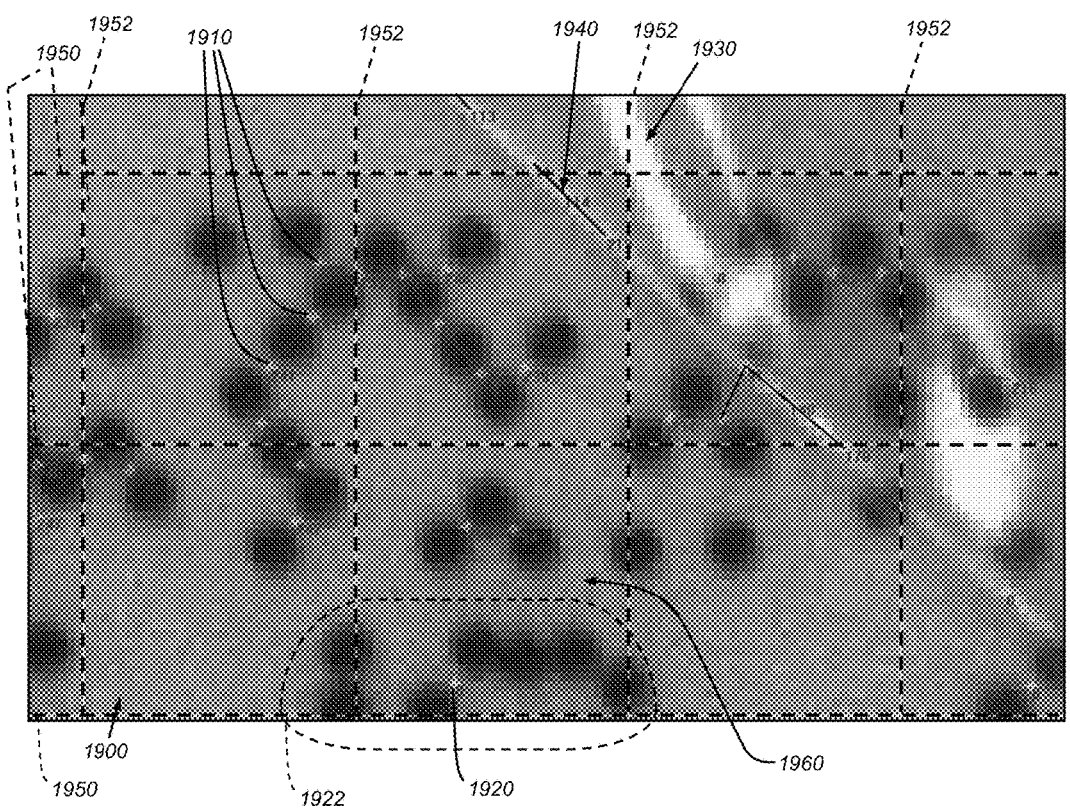
FIG. 19 is a screen display of a portion of an image containing exemplary ID features as well as similar printing and false saddle points.

As described generally above, the system and method resolves features that are likely associated with an ID from those related to noise and random features in the scene. FIG. 19, by way of example and illustration, depicts a display 1900 of a portion of an overall image of a scene in which saddle points 1910 associated with ID dots are found in addition to saddle points 1920 associated with a region 1922 of alphanumeric (dot matrix) printing. In addition, specularity 1930 on the surface of the imaged object generates a series of false saddle points along a line 1940 that extends across tiles (delineated by horizontal and vertical dashed lines 1950 and 1952). These additional saddle points pose challenges to finding actual ID features. Through pairing, alignment and filtering processes as described above, these non-ID features can be systematically eliminated. For example, false saddle points along line 1940 can be eliminated using a technique in which the center area intensity of their pixel neighborhoods is not greater than a predetermined threshold. This predetermined threshold can be derived from the mean intensity in the neighborhood. In some cases, where elimination is a particular challenge, sufficient quiet zones (e.g. region 1960) can be established between the ID and other similar structures. In various embodiments, the user can set system parameters to improve performance based on the size, orientation, resolution and relative position of the ID within the scene if such factors are known and consistent from object to object.

Illustratively, the determination and location of saddle points as described above is employed as the primary locator of DotCode candidates. It is contemplated that occasionally, one or more dots on a printed code can appear as unconnected with other diagonally neighboring dots, thereby residing in a "sparse" region of the code. Accordingly as a further process step (470 in FIG. 4), a dot-detection process can be employed (for example) after other dots have been detected by use of saddle points over the region found to contain saddle points. An appropriate bounding box, based on the expected size of the code, prevents the dot-detector/process from searching too far outside a candidate region. The dot detector can use conventional vision system techniques to search for new dot-like features in this region.

V. Locating Other Forms of Saddle Point Features in Images

Figure 20:
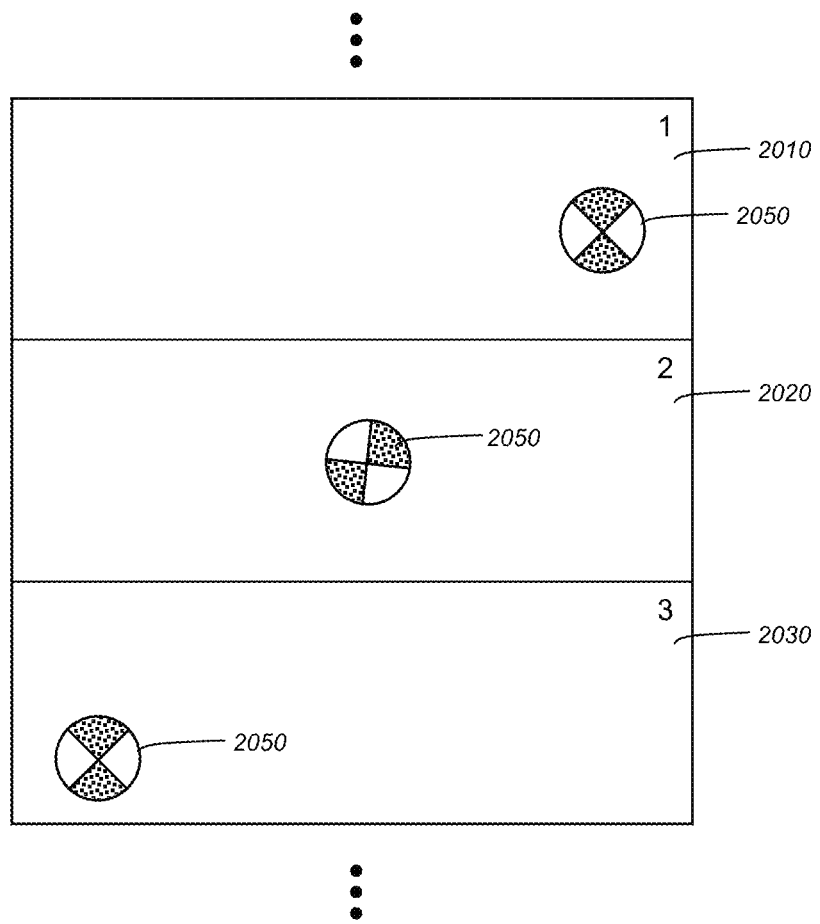
FIG. 20 is a schematic diagram of a series of exemplary image frames each containing a moving fiducial having saddle point characteristics capable of being located and tracked in accordance with the techniques of the illustrative embodiment.

It is expressly contemplated that the saddle point determination techniques described above can be applied to a variety of forms of image data that can contain saddle point information other than ID codes. By way of non-limiting example, FIG. 20 shows a sequence of image frames 2010, 2020, 2030 that can be part of a large file of such frames—for example, a sequence of frames captured by a high-speed camera system. Often objects in such capture sequences are provided with fiducials. A familiar form of fiducial (the so-called Secchi disk) 2050 is depicted at a different position/orientation in each frame. This fiducial contains clear saddle point characteristics. The system and method herein can reliably and relatively rapidly locate one or more fiducials in each frame. Where a voluminous number of frames exist in a data set, the system and method can shorten the time to analyze the data set and focus analysis on portions of the image containing such fiducials.

Figure 21:
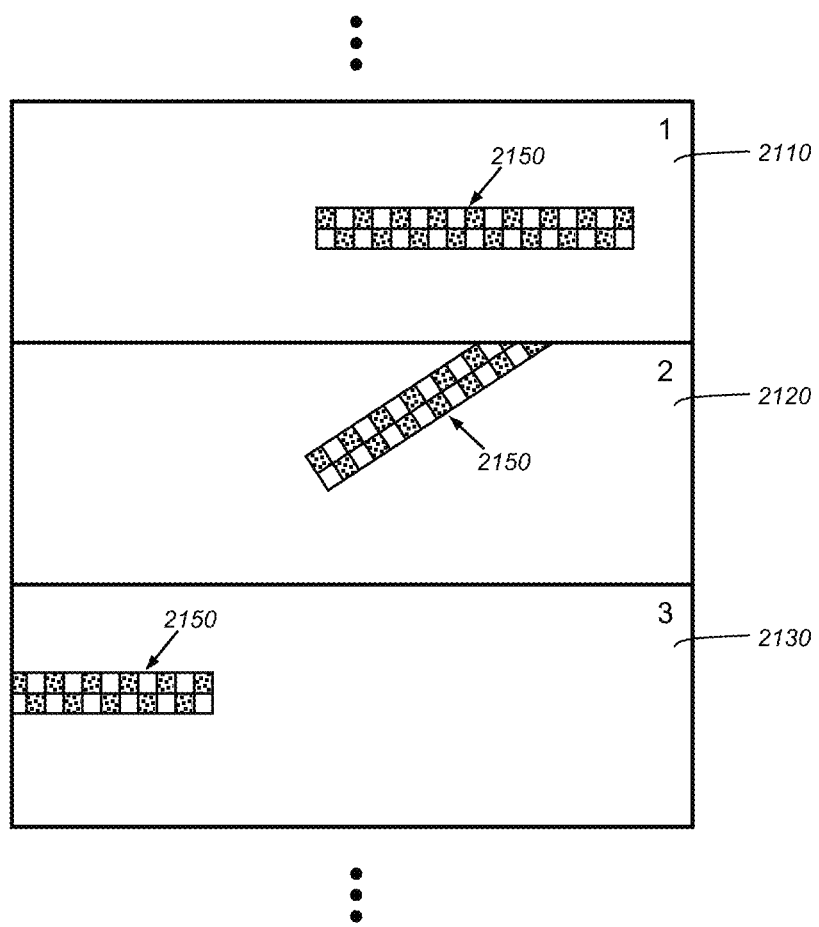
FIG. 21 is a schematic diagram of a series of exemplary image frames each containing a moving pattern having saddle point characteristics capable of being located and tracked in accordance with the techniques of the illustrative embodiment.

In another exemplary set of frames 2110, 2120, 2130, a familiar roll pattern 2150 appears at a different position and orientation in each frame. This pattern contains a large number of repeating saddle points. Again, the system and method can effectively locate and track each element of the pattern a plurality of image frames, It should be clear to those of skill that the examples of FIGS. 20 and 21 are some of a wide range of possible patterns and applications that can be analyzed using the system and method described herein.

VI. Conclusion

It should be clear that the above-described system and method for determining saddle point-like features in an image and analyzing such features to perform vision system tasks, such as ID finding and decoding, provides an efficient and versatile technique. In the particular case of DotCode decoding, the system and method addresses the particular challenge in that DotCode dots do not touch, so all neighboring dots produce saddle points. However, the robustness of the illustrative anti-correlation and angle process positions the determined saddle points with high accuracy with respect to the topology they represent. While finding algorithms often resample the original image after the coarse finding, any refinement of the ID information is accomplished based on the saddle points and not based on a more computationally intensive analysis of the dots themselves. More generally, the illustrative systems and methods herein effectively reduce processor overhead due to increased computation and increase overall processing speed when encountering certain 2D codes and other imaged features that can contain saddle-point-like structures.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while the illustrative embodiment employs only saddle points to generate a decoded ID result, it is expressly contemplated that further process steps can examine at least some dots in the candidate ID features to assist in decoding the ID. Accordingly, this description is meant to be taken only by way of example, and not to otherwise limit the scope of this invention.

What is claimed is:

1. A vision system for determining saddle point-like structures in an image comprising:
   a vision system camera assembly configured to acquire the image of an object within a field of view;
   a vision system processor comprising an anti-correlation process constructed and arranged to operate on a plurality of neighborhoods of pixels within the image and identify saddle point candidates within the neighborhoods, wherein the anti-correlation process is constructed and arranged to apply to each of the neighborhoods a 90-degree rotated kernel of each of the neighborhoods, respectively, the vision system processor being further constructed and arranged to sample at least one of the identified saddle point candidates to verify ID information and to generate a binary and clipped image of the ID information based upon at least one of the identified saddle point candidates.

2. The system as set forth in claim 1 further comprising a verification process constructed and arranged to apply to each of the neighborhoods a 180-degree rotated kernel of each of the neighborhoods, respectively.

3. The system as set forth in claim 2 wherein at least one of the 90-degree rotated kernel and the 180-degree rotated kernel includes a null center of more than one pixel.

4. The system as set forth in claim 2 wherein the anti-correlation process operates using at least one of a normalized correlation formula and a sum of absolute differences formula.

5. The system as set forth in claim 1 further comprising a refinement process constructed and arranged to establish the saddle point-like structures within the image by determining dominant angles with respect to saddle point-like candidates and spacing between adjacent saddle point-like candidates.

6. The system as set forth in claim 1 wherein a refinement process is further constructed and arranged to group the saddle point-like structures based upon respective dominant angles and spacings between adjacent saddle point-like structures.

7. The system as set forth in claim 6 wherein the refinement process further comprises a grid-fitting process constructed and arranged to establish an approximately rectilinear grid containing the saddle point-like structures.

8. The system as set forth in claim 7 further comprising eliminating saddle point like structures that are outside lines of the grid.

9. The system as set forth in claim 8 wherein the grid is established based upon topology of an ID.

10. The system as set forth in claim 9 wherein the ID defines a DotCode ID.

11. The system as set forth in claim 10 further comprising an ID determination process that generates ID information for decoding based upon the saddle point-like structures in the grid.

12. A vision system for decoding an ID in an image comprising:
a vision system camera assembly configured to acquire the image of an object within a field of view;
a vision system processor comprising a saddle point like-structure determination process that operates an anti-correlation process constructed and arranged to operate on a plurality of neighborhoods of pixels within the image and identify saddle point candidates within the neighborhoods such that the saddle point like-structure determination process generates grouped saddle point-like structures with respect to the image, wherein the anti-correlation process is constructed and arranged to apply to each of the neighborhoods a 90-degree rotated kernel of each of the neighborhoods, respectively;
an ID verification process that samples at least one saddle point like-structure to verify ID information;
an ID determination process that, based upon the grouped saddle-point-like structures, generates a binary and clipped image of the ID information; and
an ID decoding process that decodes the ID information.

13. The system as set forth in claim 12 wherein the ID defines a DotCode ID.

14. The system as set forth in claim 13 further comprising a dot detector that searches for dot-like features in a region of the image containing the ID to verify all dots in the region have been located.

15. A method for determining saddle point-like structures in an image comprising:
acquiring the image of an object within a field of view using a vision system camera assembly;
using a vision system processor, operating on each of a plurality of neighborhoods of pixels within the image and identifying saddle point candidates within the neighborhoods by applying an anti-correlation kernel to each of the neighborhoods that includes applying a 90-degree rotated kernel of each of the neighborhoods, respectively;
sampling at least one of the identified saddle point candidates to verify ID information; and
generating a binary and clipped image of the ID information based upon at least one of the identified saddle point candidates.

16. The method as set forth in claim 15 wherein the step of applying the anti-correlation kernel includes using at least one of a normalized correlation formula and a sum of absolute differences formula.

17. The method as set forth in claim 15 wherein at least some of the saddle point candidates are associated with an ID code.

* * * * *